(12) United States Patent
Oh et al.

(10) Patent No.: US 9,840,187 B2
(45) Date of Patent: Dec. 12, 2017

(54) LED LIGHT BAR COVER

(71) Applicants: Kwang J. Oh, La Crescenta, CA (US); Loren Oh, Irvine, CA (US); Austin Oh, Azusa, CA (US); Heidi Oh, La Crescenta, CA (US)

(72) Inventors: Kwang J. Oh, La Crescenta, CA (US); Loren Oh, Irvine, CA (US); Austin Oh, Azusa, CA (US); Heidi Oh, La Crescenta, CA (US)

(*) Notice: Subject to any disclaimer, the term of this patent is extended or adjusted under 35 U.S.C. 154(b) by 119 days.

(21) Appl. No.: 14/944,829

(22) Filed: Nov. 18, 2015

(65) Prior Publication Data

US 2016/0161094 A1 Jun. 9, 2016

Related U.S. Application Data

(60) Provisional application No. 62/089,105, filed on Dec. 8, 2014, provisional application No. 62/089,116, filed on Dec. 8, 2014, provisional application No. 62/105,668, filed on Jan. 20, 2015.

(51) Int. Cl.
*F21V 17/10* (2006.01)
*B60Q 1/26* (2006.01)

(52) U.S. Cl.
CPC .......... *B60Q 1/2611* (2013.01); *B60Q 1/2615* (2013.01)

(58) Field of Classification Search
CPC .............. F21S 48/1778; F21S 48/1773; F21S 48/1784; F21S 48/1789
See application file for complete search history.

(56) References Cited

U.S. PATENT DOCUMENTS

| | | | | |
|---|---|---|---|---|
| 4,835,515 | A * | 5/1989 | McDermott | B60Q 1/2611 340/472 |
| 8,727,413 | B2 * | 5/2014 | Seiller | B60R 11/00 296/24.34 |
| 2009/0256697 | A1 * | 10/2009 | Tallinger | B60Q 1/2611 340/472 |
| 2010/0237211 | A1 * | 9/2010 | Vigil | B60Q 1/2611 248/291.1 |
| 2014/0327263 | A1 * | 11/2014 | Van Arnam | B60Q 1/52 296/19 |

* cited by examiner

*Primary Examiner* — Anabel Ton
(74) *Attorney, Agent, or Firm* — John K. Park; Park Law Firm (57) ABSTRACT

A light bar cover for covering a light bar is provided, which comprises a cover portion, hinges, cover handles, hook rings, and one or more hooks. The cover portion is configured for covering a front portion of the light bar. The hinges are installed between the cover portion and the light bar, so as to open and close the cover portion about the hinges. Each of the cover handles is disposed on an exterior surface of the cover portion. Each of the hook rings is disposed on an exterior surface of the light bar. The hooks are configured for holding each of the cover handles and a corresponding hook ring, so as to hold securely the cover portion in an open position or a close position.

13 Claims, 9 Drawing Sheets

LED LIGHT BAR COVER

RELATED APPLICATION

This application is a Non-provisional Application of Provisional Application Ser. Nos. 62/089,105 for "Open and Close LED Light Bar Cover with Light Reflective Reflector for Vehicle" filed on Dec. 8, 2014, 62/089,116 for "Open and Close LED Light Bar Cover with Light Reflector for Vehicle" filed on Dec. 8, 2014, and 62/105,668 for "Inserted Reflective Flip Cover for Vehicular LED Light Bar" filed on Jan. 20, 2015.

BACKGROUND OF THE INVENTION

The present invention relates to an inserted reflective flip cover for vehicular LED light bar.

For most automobiles in the US, except special designated cars, the distance of the installed search light (light bars) are to be maintained a minimum of 16 inches from the ground. If the driver leaves the light on by mistake in the street with no cover on the light bar, the drive can get a violation ticket.

A common issue of the light bar is the length of the light-bar itself. In order to attach the cover to the light bar, a person (is required to exit the vehicle with the vehicle (not in motion) in order to manually remove or attach the entire light-bar which can result in injury or damages to either the driver or the vehicle itself.) needs to exit from the car and go around right and left sides of the car to attach or remove the cover from the light bar.

Another problem is the case of when a standard cover is not securely attached to the light bar—this can result in serious damages to not only the vehicle but create a hazardous situation for the driver and other drivers on the road. When the cover is not safely mounted to the light bar and driven in high speed, the cover can slip out and fly away from the light bar that can be hazard to other drivers around.

Still another problem is when the cover is removed from light bar, the face of the light bar is constantly exposed to dust, scratches and heat of the sun that can shorten the life of light bar.

Another issue that can be addressed is the amount of power you get out of the direction of the light bar—the light bar may lose significant amounts of illuminating power if completely exposed without proper casing.

As for technicalities, something that may be of bother to a driver would be the physical space in which the cover for the light bar is stowed. Once removed, the standard light bar cove must be placed within the vehicle if the driver needs to place it back on when needed. This creates significant issues regarding space and maneuverability when it comes to owners who need the extra space.

Another problem is when the power of the light bar is turned on, there is significant loss amount of light energy into open space.

Another issue is when the cover is removed from light bar, it will take extra space to place it inside the car.

Accordingly, a need for an inserted reflective flip cover for vehicular LED light bar has been present for a long time considering the expansive demands in the everyday life. This invention is directed to solve these problems and satisfy the long-felt need.

SUMMARY OF THE INVENTION

The present invention contrives to solve the disadvantages of the prior art.

An aspect of the invention provides a light bar cover for covering a light bar, which comprises a cover portion, a plurality of hinges, one or more cover handles, two or more hook rings, and one or more hooks.

The cover portion is configured for covering a front portion of the light bar.

The plurality of hinges are installed between the cover portion and the light bar, so as to open and close the cover portion about the plurality of hinges.

Each of the one or more cover handles is disposed on an exterior surface of the cover portion.

Each of the two or more hook rings is disposed on an exterior surface of the light bar.

The one or more hooks are configured for holding each of the one or more cover handles and a corresponding hook ring, so as to hold securely the cover portion in an open position or a close position.

Each of the one or more hooks may be rigid, and a first hook ring may be disposed at a lower portion of the light bar and a second hook ring may be disposed at an upper portion of the light bar, and wherein a first distance from a cover handle to the first hook ring when the cover is in the close position is substantially same as a second distance from the cover handle to the second hook ring when the cover is in the open position.

An end portion of each of the one or two hooks may engage the cover handle movably.

The end portion may be made of a closed ring.

Each of the one or more hooks may be elastic.

The light bar cover may further comprise a plurality of upper magnets and a plurality of lower magnets.

The plurality of upper magnets may be installed on an upper portion of the light bar, each of which being configured to be attracted to a magnetic material provided on an upper portion of the cover portion, so that one of the plurality of upper magnets attracts the magnetic material so as to facilitate maintaining an open state of the cover portion.

The plurality of lower magnets may be installed on a lower portion of the light bar, each of which being configured to be attracted to a magnetic material provided on a lower portion of the cover portion, so that one of the plurality of lower magnets attracts the magnetic material so as to facilitate maintaining a close state of the cover portion.

The light bar cover may further comprise a plurality of rubber springs on an edge portion of the light bar, so that the cover portion is pushed out toward the open state by the plurality of rubber springs.

The light bar cover may further comprise a reflector film disposed on an inner surface of the cover portion, so as to reflect stray light from the light bar toward a front direction.

The cover portion may comprise an aerodynamic shape for minimizing air resistance, and wherein the aerodynamic shape is partially circular or triangular.

Another aspect of the invention provides a light bar cover for covering a light bar comprises a cover portion, a plurality of hinges, and two or more electromagnets.

The cover portion is configured for covering a front portion of the light bar.

The plurality of hinges are installed between the cover portion and the light bar, so as to open and close the cover portion about the plurality of hinges.

Each of the two or more electromagnets is installed on an upper portion of the light bar, so as to hold securely the cover portion in an open position.

The light bar cover may further comprise one or more cover handles, each of which being disposed on an exterior surface of the cover portion.

The light bar cover may further comprise a motor, a motor gear, and a cover gear.

The motor is installed on a top edge of the light bar.

The motor gear is connected to an axle of the motor.

The cover gear is disposed on a top edge of the cover portion and engaging the motor gear.

The motor, the motor gear, and the cover gear are configured to open or close the cover portion.

Still another aspect of the invention provides a light bar cover for covering a light bar, comprising a cover holder body, a cover portion, a plurality of hinges, and two or more electromagnets.

The cover holder body includes a plurality of fasteners for attaching the frame portion to the light bar and a plurality of cover holders.

The cover portion is configured for covering a front portion of the cover holder body and a front portion of the light bar.

The plurality of hinges are installed between the cover portion and the cover holder body, so as to open and close the cover portion about the plurality of hinges.

Each of the two or more electromagnets is installed on an upper portion of the cover holder body, so as to hold securely the cover portion in an open position.

The light bar cover may further comprise a motor, a motor gear, and a cover gear.

The motor is installed on a top edge of the cover holder body.

The motor gear is connected to an axle of the motor.

The cover gear is disposed on a top edge of the cover portion and engaging the motor gear.

The motor, the motor gear, and the cover gear are configured to open or close the cover portion.

The advantages of the present invention are: (1) the light bar cover according to the invention provides a reliable cover for LED light bar; and (2) the light bar cover provides a secure cover for light bar.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

The U.S. Provisional Patent Application Nos. 62/089,105 for "Open and Close LED Light Bar Cover with Light Reflective Reflector for Vehicle" filed on Dec. 8, 2014, 62/089,116 for "Open and Close LED Light Bar Cover with Light Reflector for Vehicle" filed on Dec. 8, 2014, and 62/105,668 for "Inserted Reflective Flip Cover for Vehicular LED Light Bar" filed on Jan. 20, 2015 are incorporated by reference herein for any and all purposes.

In view of the problems of prior arts, there is a need for cover of the light bar that:

1. Is able to easily removed from and re-attached to the roof (2) of vehicle (1);

2. Provides safety from the risk of failing to mount the cover onto the light bar;

3. That is both convenient for access and also increases the protection of the face of light bar from dust, scratch, and heat;

4. Collects and increases the brightness without extra energy expenditure;

5. Removes unnecessary storage space inside the car for travel with the light bar cover.

Figure 1:
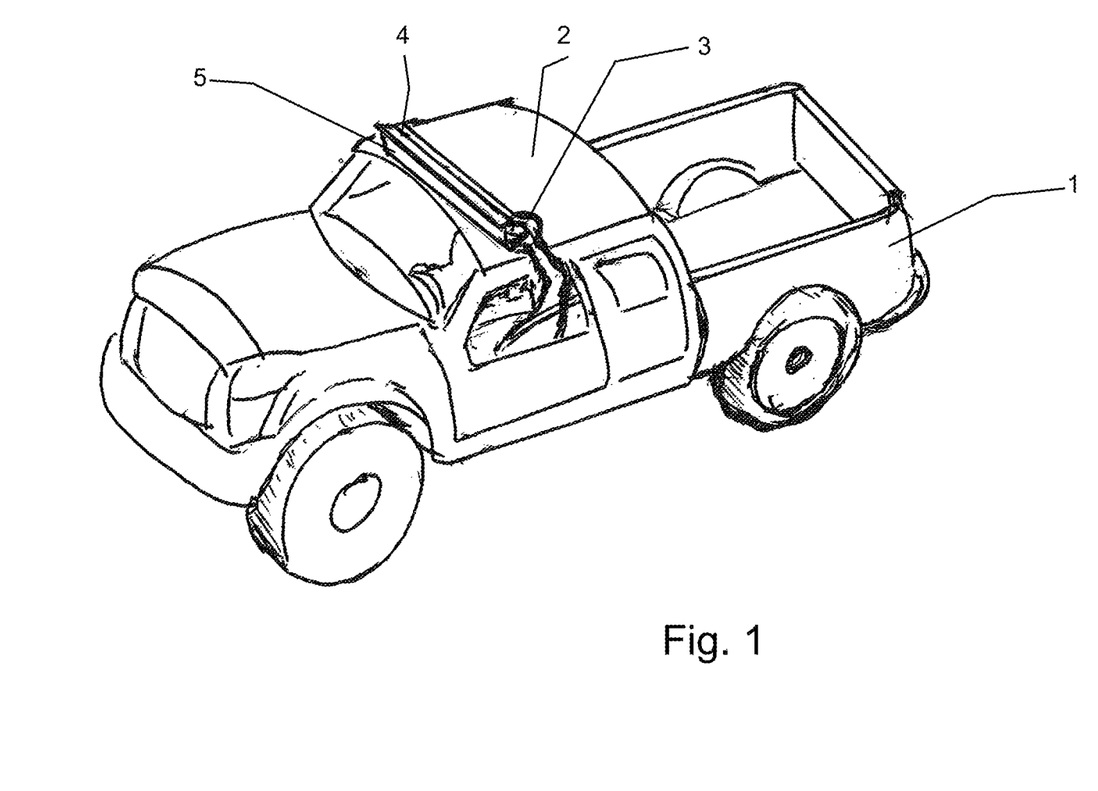
FIG. 1 is a perspective view of a vehicle equipped with open and close LED light reflect light bar cover with one hand operation according to an embodiment of the invention.

An object of the present invention is to provide an easy flip-cover for the light bar which only requires a simple one hand (3) touch without the driver needing to exit the vehicle (1) as shown in FIG. 1.

Another object of the present invention is to provide the panel cover (which is attached to the face of the light bar) which can easily move up and down with connection of hinge.

Still another object of the present invention is to provide a cover, so that when the cover is closed, it is securely attached to magnet that is attached on the bottom of the light bar.

Still another object of the present invention is to provide a cover, which gives the ease of when the driver wants to open the cover; he/she can simply lift the cover and open it all the way until it reaches the top side of light bar. When the cover panel reaches to the top of the light bar, the cover panel will be attached on top side light bar by magnet(s) or electromagnet that is installed on top side of the light bar.

Still another object of the present invention is to provide a cover using electromagnet, in which when the LED light power is turned off, the electromagnet power will automatically release the cover and the cover will automatically be dropped slowly and will cover the face of the LED light bar. This will prevent from getting violation ticket, by accidentally uncovering the light bar while driving.

The device will make sure that the cover is safely closed when ever the power is turned off. The cover will be closed automatically when LED power is turned off. When the cover needs to be opened, it will be opened only when the driver reach the cover and open and raise the cover to upper direction to reach to electromagnet. Then the cover is securely attached and held by electromagnet while using LED light.

Still another object of the present invention is to provide a cover having a motor with gear (pulley gear), which is installed on the body of the LED light bar so that the cover has a cover gear that when the motor switch in on, the cover will be opened with power of the motor.

Still another object of the present invention is to provide a LED light bar cover, which is made separate unit to be inserted to the body of LED light bar. There are screws top and bottom of the cover and when it is inserted to the body of the LED light bar, it can be tightened for secure hold. There is also clip fastener from the cover, which will be fastened to the body of the LED light bar for additional secure hold of the cover with body of the LED light bar.

Still another object of the present invention is to provide a cover, in which an outer cover is designed in curved aerodynamic shape to make it less resistant to air while driving in high speed condition in highway. It will create smooth aerodynamic flow of air. Another shape of the aerodynamic cover shape is triangular shape in front for smooth air flow. Still another shape of the aerodynamic cover shape is flat with slope for the air to flow smoothly.

Still another object of the invention is to provide a reflector film panel on inside of the cover that will reflect the light to direct the energy of the bright light when the cover is opened. When the light is turned on in the light bar, the light that is exposed to the upper space will not be wasted but will be collected and reflect downward to the ground that will maximize the brightness of the light (which can add brightness to the vehicles provided light) while using the same amount of energy.

Still another object of the invention is to provide increased safety by reducing the risk of mounting failure of cover to the light bar that can create hazard flying object to other drivers in high speed roads. The cover of the light bar does not need to be removed and reattached from the light bar as it is securely attached with the hinge while being securely fastened at all the times utilizing the strength of the magnetic hold. For extra and sure-fire security, a feature using a road hook connecting the handle of the light bar to the holder-ring (located on the rear-side of the light bar) locks the cover to the light bar in case of even more extreme conditions. This gives the driver an even stronger sense of security in regards to worrying about the security of the placement of the cover.

This ensures that even in conditions of high speed and strong wind, the cover will securely be attached to the main body of the light bar.

Still another object of the invention is to provide a protection of device by adding fast and simple way of covering the face of the light bar, it will protect the face of light bar from damages of dust, scratches, and long exposure to high daylight heat.

Still another object of the invention is to provide an extra cargo space by avoiding the need to take the cover part to store inside the car. This is particularly troublesome for most light bar covers are made out of non-collapsible or malleable material which is longitudinally challenging for storage within the vehicle (1).

Still another object of the invention is to provide an additional option to use off road hook to give more secure hold of opened light bar cover when the vehicle (1) is driven in off road condition. Opened light bar cover can be securely fasten with hook connecting from handle of the light bar cover to off road holder ring that is located on rear side of the light bar.

An aspect of the invention provides a light bar cover device (100) for covering a light bar (5), which comprises a cover portion (4), a plurality of hinges (8, 9, 10), one or more cover handles (6, 7), two or more hook rings (16, 16', 17, 17'), and one or more hooks (18) as shown in FIGS. 2-5.

The cover portion (4) is configured for covering a front portion of the light bar (5).

The plurality of hinges (8, 9, 10) are installed between the cover portion (4) and the light bar (5), so as to open and close the cover portion (4) about the plurality of hinges (8, 9, 10). Of course, it is not limited to hinges for connecting the cover portion (4) and the top edge of the light bar (5). If it can connect, open, and close the cover portion (4), then any device or means can be adopted.

Each of the one or more cover handles (6, 7) is disposed on an exterior surface of the cover portion (4). As shown in FIG. 1, the cover handles (6, 7) can be disposed so that the user inside the car can reach up and operate the cover portion (4).

Figure 2:
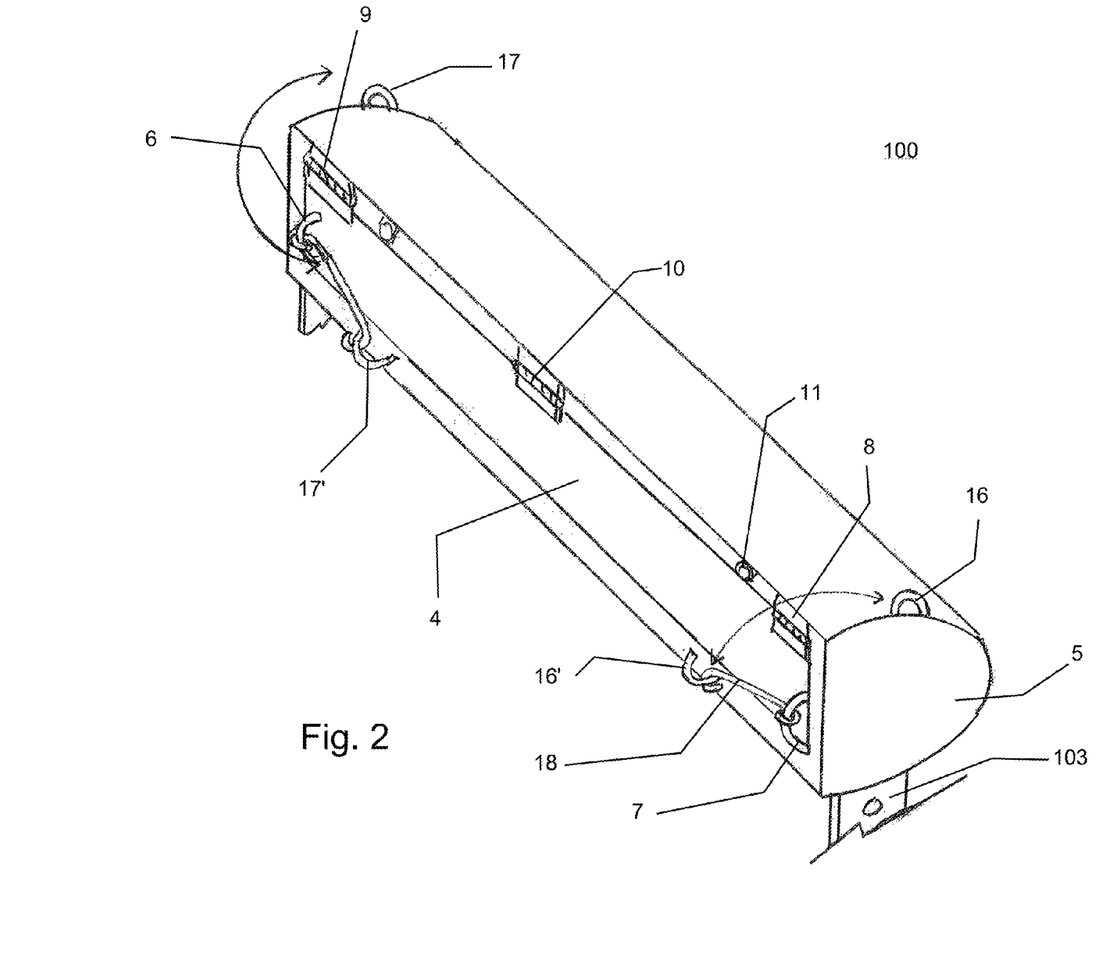
FIG. 2 is a perspective view of an LED light bar cover in a closed position according to an embodiment of the invention.
Figure 3:
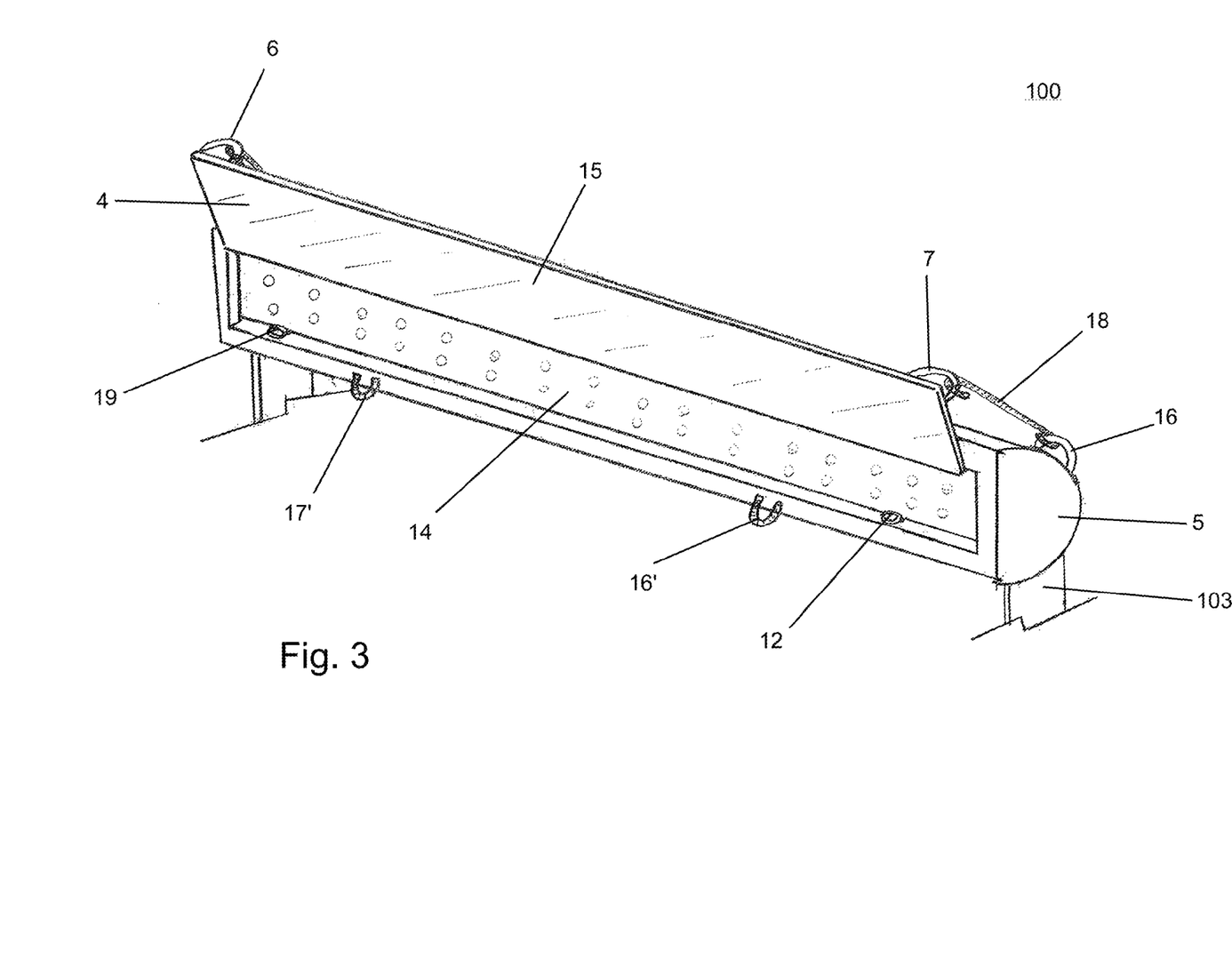
FIG. 3 is a perspective view of an LED light bar cover in an opened position according to an embodiment of the invention.
Figure 4:
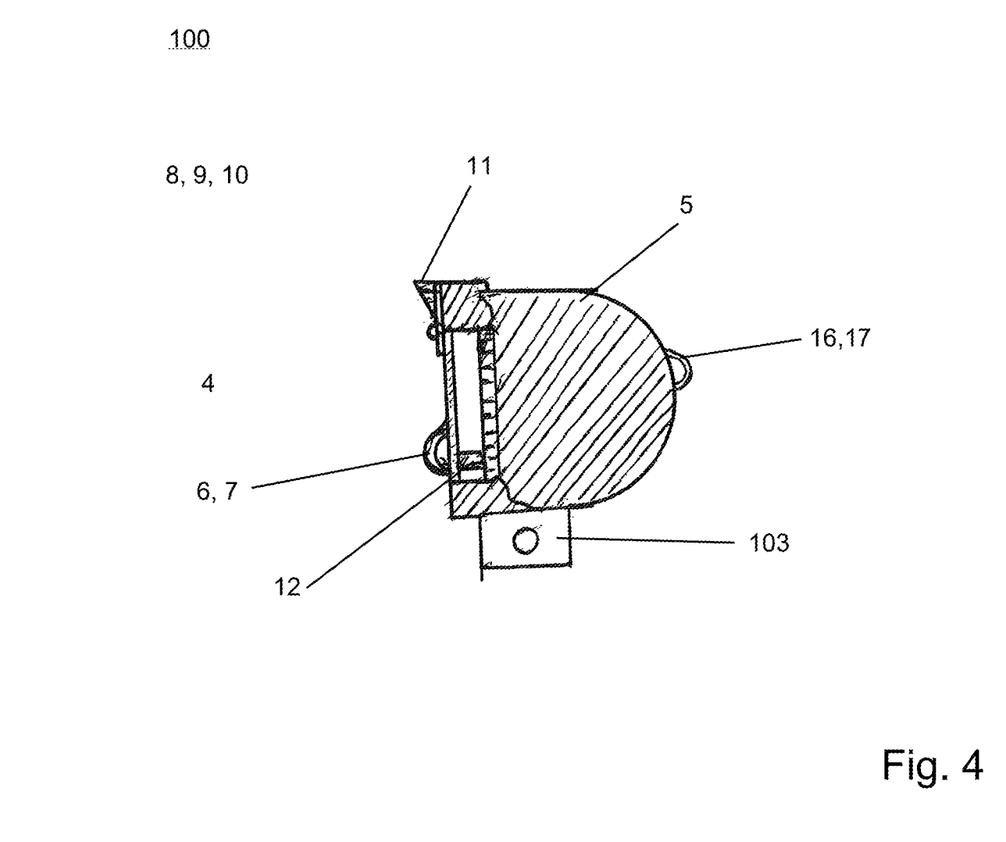
FIG. 4 is a cross-sectional view of an LED light bar cover according to an embodiment of the invention.

Each of the two or more hook rings (16, 16', 17, 17') is disposed on an exterior surface of the light bar (5) as shown in FIGS. 2-4.

Each of the one or more hooks (18) is configured for holding each of the one or more cover handles (6, 7) and a corresponding hook ring (16, 17), so as to hold securely the cover portion (4) in an open position (FIG. 3) or a close position (FIGS. 2 and 4). As illustrated, each of one or more hooks (18) may include hook portions at both ends thereof.

Each of the one or more hooks (18) may be rigid, and a first hook ring (16', 17') may be disposed at a lower portion of the light bar (5) and a second hook ring (16, 17) may be disposed at an upper portion of the light bar (5), and a first distance from a cover handle (6, 7) to the first hook ring (16', 17') when the cover portion (4) is in the close position is substantially same as a second distance from the cover handle (6, 7) to the second hook ring (16, 17) when the cover is in the open position. In this case, the hook portions of the hook (18) may be flexible to be hooked to and unhooked from the hook rings (16, 16', 17, 17').

An end portion of each of the one or two hooks (18) may engage the cover handle (6, 7) movably. The end portion may be made of a closed ring, so that the hook (18) is dangled from the cover handle (6, 7).

Each of the one or more hooks (18) may be elastic like rubber strap material.

The light bar cover (100) may further comprise a plurality of upper magnets (11) and a plurality of lower magnets (12) as shown in FIGS. 2-4.

The plurality of upper magnets (11) may be installed on an upper portion of the light bar (5), each of which being configured to be attracted to a magnetic material provided on a corresponding upper portion of the cover portion (4), so that one of the plurality of upper magnets (11) attracts the magnetic material so as to facilitate maintaining an open state of the cover portion (4).

The plurality of lower magnets (12) may be installed on a lower portion of the light bar (5), each of which being configured to be attracted to a magnetic material provided on a lower portion of the cover portion (4), so that one of the plurality of lower magnets (12) attracts the magnetic material so as to facilitate maintaining a close state of the cover portion (4).

The light bar cover (100) may further comprise a plurality of rubber springs (19) on an edge portion of the light bar (5) as shown in FIG. 3, so that the cover portion (4) is pushed out toward the open state by the plurality of rubber springs (19), and also the rubber springs (19) can work as a bumper for a closing operation of the cover portion (4).

The light bar cover (100) may further comprise a reflector film (15) disposed on an inner surface of the cover portion (4) as shown in FIG. 3, so as to reflect stray light from the light bar (5) toward a front direction, preventing waste of light. The reflector film (15) may be attached to the inner surface of the cover portion (4) through conventional methods such as glue or fasteners.

As shown in FIGS. 5-11, the cover portion (4) may comprise an aerodynamic shape for minimizing air resistance, and the aerodynamic shape is partially circular or triangular.

Figures 5, 6:
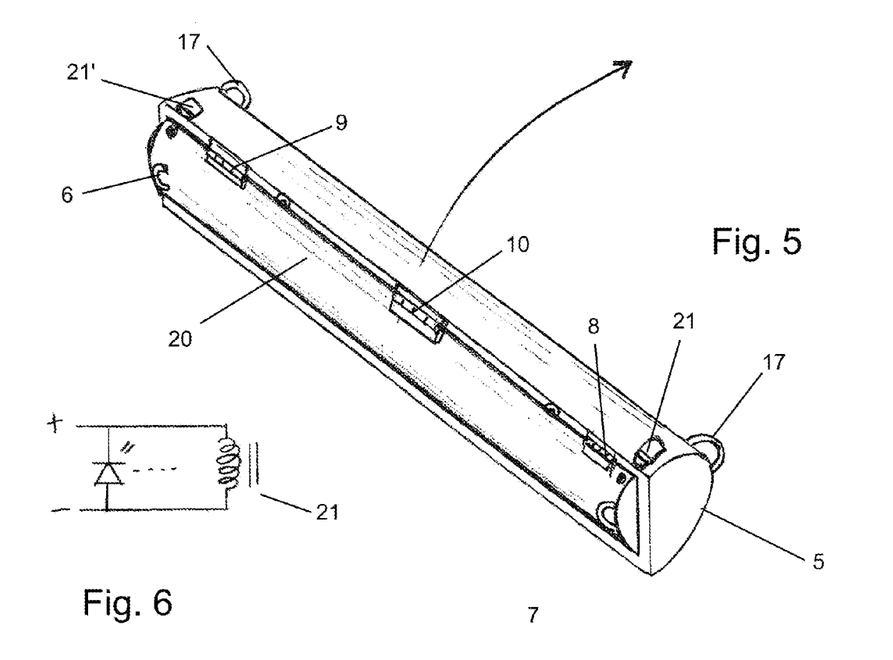
FIG. 5 is a perspective view of an LED light bar cover with aerodynamic cover according to an embodiment of the invention.
FIG. 6 is an electronic diagram of a cover holder electromagnet according to an embodiment of the invention.
Figures 8, 9:
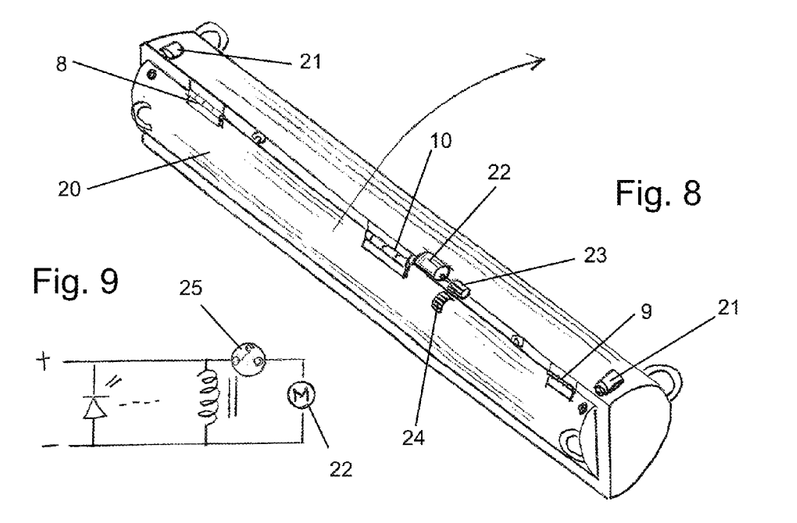
FIG. 8 is a perspective view of an LED light bar cover with a motor installed according to an embodiment of the invention.
FIG. 9 is an electronic diagram of a cover holder electromagnet with a motor according to an embodiment of the invention.

Another aspect of the invention provides a light bar cover for covering a light bar comprises a cover portion (20), a plurality of hinges (8, 9, 10), and two or more electromagnet (21, 21') as shown in FIGS. 5 and 8. Of course, these electromagnets (21, 21') may be matched with magnetic portions provided as circular dots in the cover portion (20).

Figure 7:
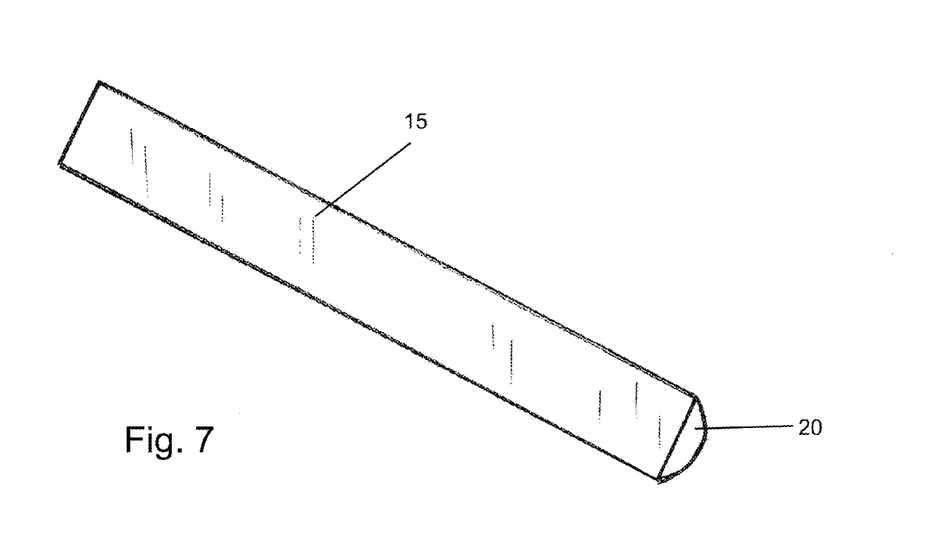
FIG. 7 is a perspective view of a reflective side of an aerodynamic LED light bar cover according to an embodiment of the invention.
Figures 10, 11:
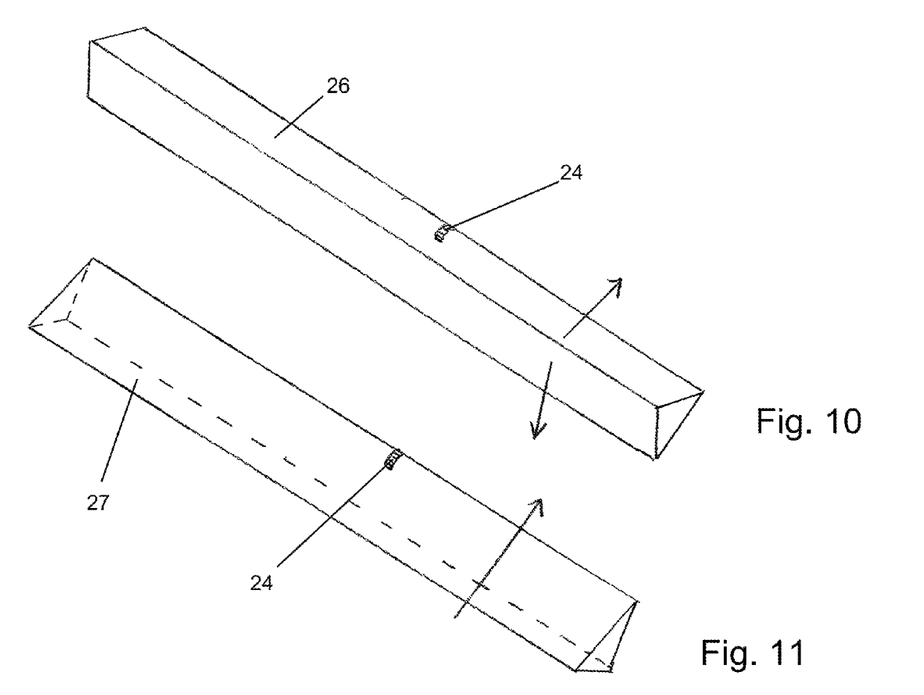
FIG. 10 is a perspective view of an LED light bar cover of a triangular aerodynamic shape according to an embodiment of the invention.
FIG. 11 is a perspective view of an LED light bar cover of a flat sloped aerodynamic shape according to an embodiment of the invention.

Still, the cover portion (20) is configured for covering a front portion of the light bar (5). The surface facing and contacting front surface of the light bar (5) is still flat for covering the light bar (5) as shown in FIGS. 7 and 11.

The plurality of hinges (8, 9, 10) are installed between the cover portion (4) and the light bar (5), so as to open and close the cover portion (4) about the plurality of hinges (8, 9, 10).

Each of the two or more electromagnets (21, 21') is installed on an upper portion of the light bar (5), so as to hold securely the cover portion (4) in an open position.

These electromagnets (21, 21') may be controlled to facilitate the operations of the cover portion (4). For example, the electromagnets (21, 21') are activated for the open position of the cover portion (4), and deactivated for the close position. It can be controlled so that the electromagnets (21, 21') are deactivated to release the cover portion (4) into the close position.

The light bar cover (100) may further comprise one or more cover handles (6, 7) as in the previous embodiments, each of which being disposed on an exterior surface of the cover portion (4).

In certain embodiments, the light bar cover (100) may further comprise a motor (22), a motor gear (23), and a cover gear (24) as shown in FIGS. 8 and 9.

The motor (22) is installed on a top edge of the light bar (5).

The motor gear (23) is connected to an axle of the motor (22).

The cover gear (24) is disposed on a top edge of the cover portion (4) and engaging the motor gear (23).

The motor (22), the motor gear (23), and the cover gear (24) are configured to open or close the cover portion (4). The motor (22) can be controlled using conventional electronics (not shown).

Still another aspect of the invention provides a light bar cover (100)for covering a light bar (5), comprising a cover holder body (32), a cover portion (4, 20), a plurality of hinges (8, 9, 10, 33), and two or more electromagnets (11, 12) as shown in FIGS. 12-18.

The cover holder body (32) includes a plurality of fasteners (28, 28') for attaching the frame portion (32) to the light bar (5) and a plurality of cover holders (401).

The cover portion (4, 20) is configured for covering a front portion of the cover holder body (32) and a front portion of the light bar (5).

The plurality of hinges (8, 9, 10, 33) are installed between the cover portion (4, 20) and the cover holder body (32), so as to open and close the cover portion (4, 20) about the plurality of hinges (8, 9, 10, 33).

Each of the two or more electromagnets is installed on an upper portion of the cover holder body, so as to hold securely the cover portion in an open position.

The light bar cover (100) may further comprise a motor (22), a motor gear (23), and a cover gear (24).

The motor (22) is installed on a top edge of the cover holder body (32).

The motor gear (23) is connected to an axle of the motor (22).

The cover gear (24) is disposed on a top edge of the cover portion (4, 20) and engaging the motor gear (23).

The motor (22), the motor gear (23), and the cover gear (24) are configured to open or close the cover portion (4, 20).

Figure 12:
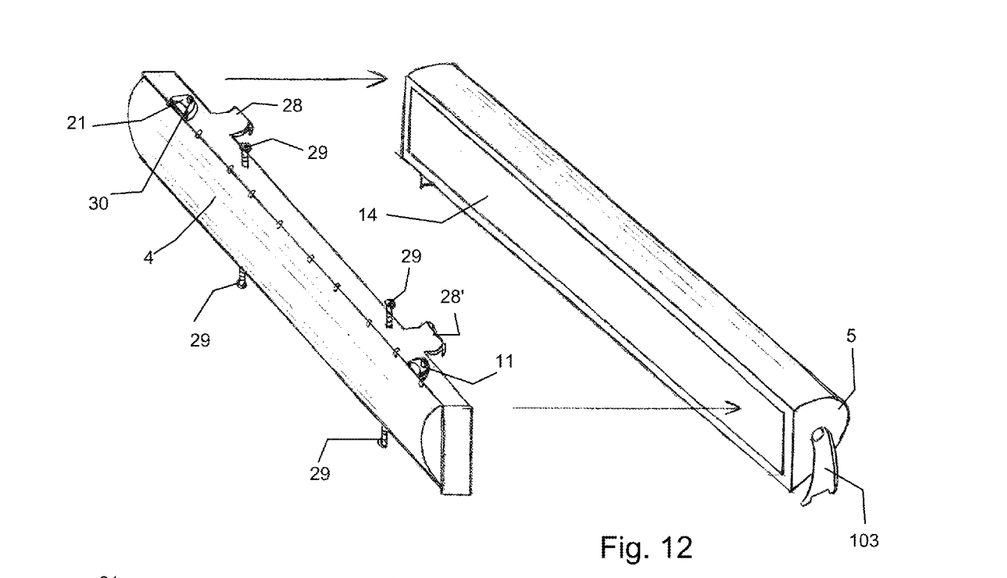
FIG. 12 is a perspective view of an LED light bar cover detached from an LED light bar according to an embodiment of the invention.
Figures 13, 14:
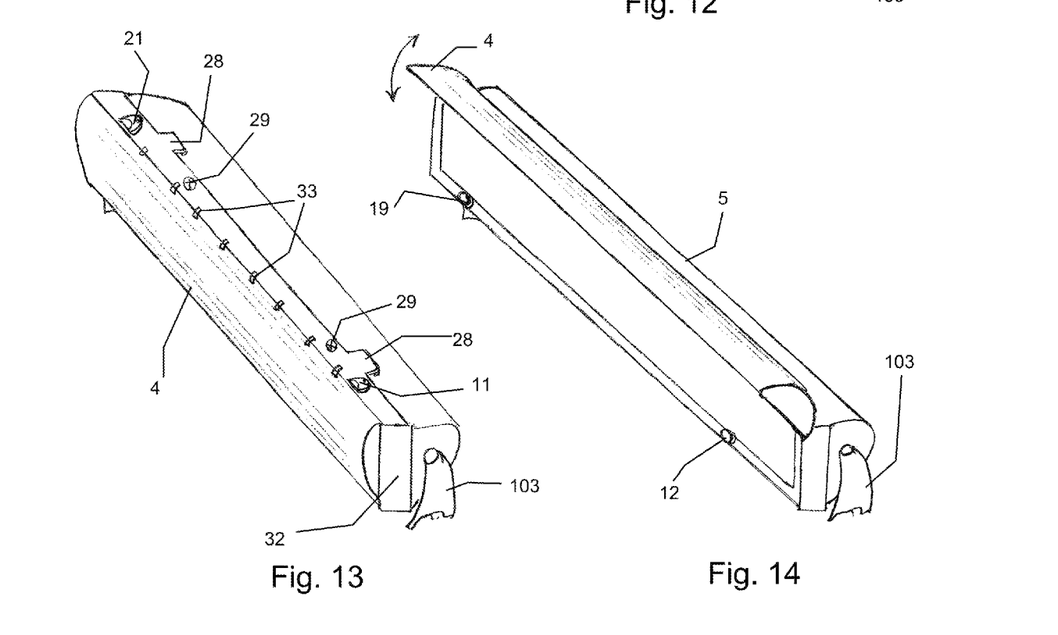
FIG. 13 is a perspective view of an LED light bar cover attached to an LED light bar according to an embodiment of the invention.
FIG. 14 is a perspective view of an LED light bar cover attached to an LED light bar with the cover opened according to an embodiment of the invention.

In certain embodiments as shown in FIGS. 12 and 13, the cover holder body (32) can be attached further by screws (29).

The light bar (100) can be installed by a mount stand (102) as shown in figures.

Figures 15, 16:
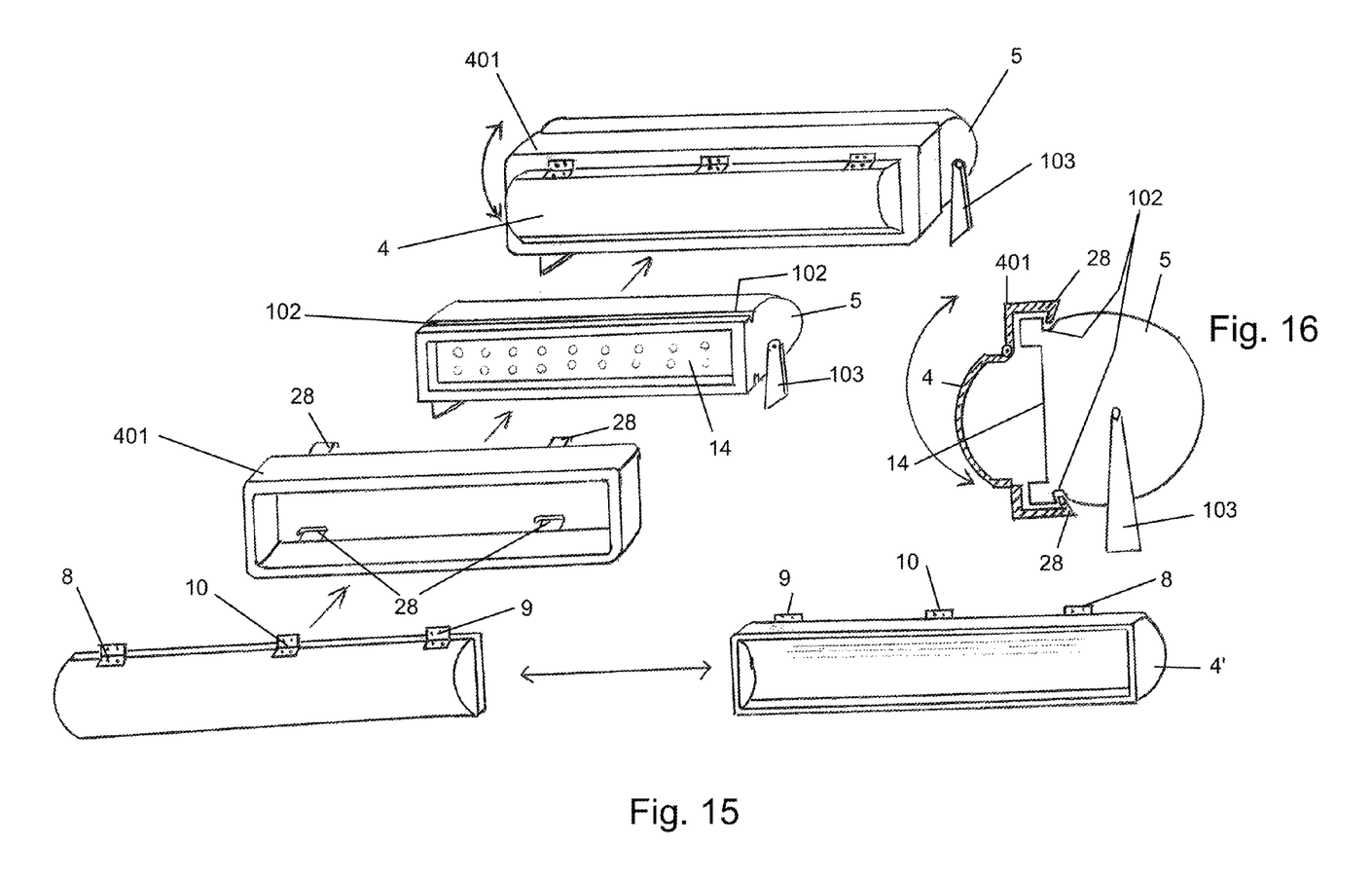
FIG. 15 is an exploded perspective view of an LED light bar with an insertable cover body to a main body of a light bar according to an embodiment of the invention.
FIG. 16 is a cross-sectional view of an LED light bar with an insertable cover body to a main body of a light bar.
Figure 17:
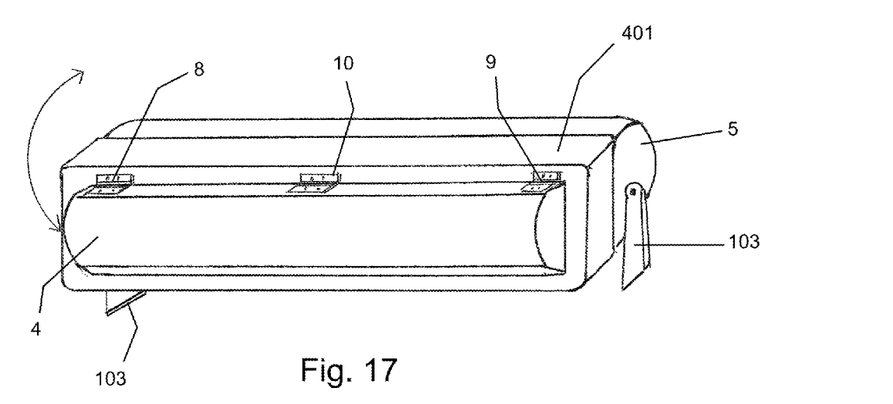
FIG. 17 is a perspective view of a closed cover of LED light bar with an insertable cover body to a main body of a light bar.
Figure 18:
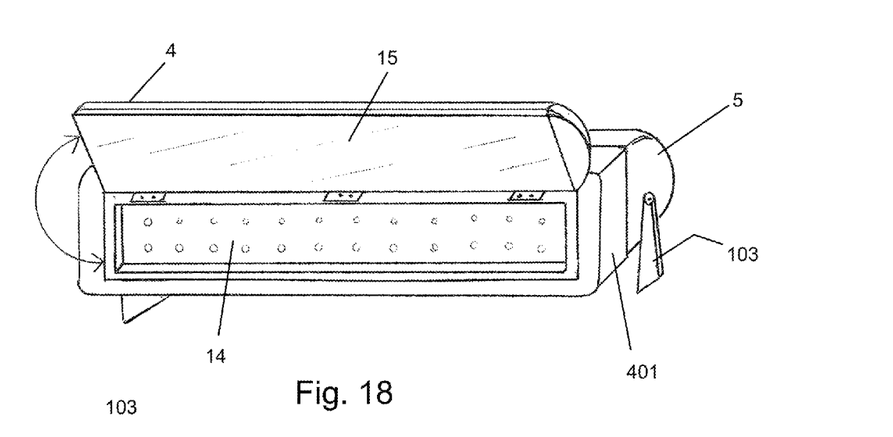
FIG. 18 is a perspective view of an opened cover of an LED light bar with an insertable cover body to a main body of a light bar.

The plurality of cover holders (401) are disposed around the cover holder body (32) and configured to engage a holding groove provided around the edge portion of the light bar (5) as shown in FIGS. 15 and 16.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A light bar cover for covering a light bar, the light bar cover comprising:
   a cover portion configured for covering a front portion of the light bar;
   a plurality of hinges installed between the cover portion and the light bar, so as to open and close the cover portion about the plurality of hinges;
   one or more cover handles, each of which being disposed on an exterior surface of the cover portion;

two or more hook rings, each of which being disposed on an exterior surface of the light bar; and one or more hooks configured for holding each of the one or more cover handles and a corresponding hook ring, so as to hold securely the cover portion in an open position or a close position.

2. The light bar cover of claim 1, wherein each of the one or more hooks is rigid, and wherein a first hook ring is disposed at a lower portion of the light bar and a second hook ring is disposed at an upper portion of the light bar, and wherein a first distance from a cover handle to the first hook ring when the cover is in the close position is substantially same as a second distance from the cover handle to the second hook ring when the cover is in the open position.

3. The light bar cover of claim 2, wherein an end portion of each of the one or two hooks engages the cover handle movably.

4. The light bar cover of claim 3, wherein the end portion is made of a closed ring.

5. The light bar cover of claim 1, wherein each of the one or more hooks is elastic.

6. The light bar cover of claim 1, further comprising:
a plurality of upper magnets installed on an upper portion of the light bar, each of which being configured to be attracted to a magnetic material provided on an upper portion of the cover portion, so that one of the plurality of upper magnets attracts the magnetic material so as to facilitate maintaining an open state of the cover portion; and a plurality of lower magnets installed on a lower portion of the light bar, each of which being configured to be attracted to a magnetic material provided on a lower portion of the cover portion, so that one of the plurality of lower magnets attracts the magnetic material so as to facilitate maintaining a close state of the cover portion.

7. The light bar cover of claim 1, further comprising a plurality of rubber springs on an edge portion of the light bar, so that the cover portion is pushed out toward the open state by the plurality of rubber springs.

8. The light bar cover of claim 1, further comprising a reflector film disposed on an inner surface of the cover portion, so as to reflect stray light from the light bar toward a front direction.

9. The light bar cover of claim 1, wherein the cover portion comprises an aerodynamic shape for minimizing air resistance, and wherein the aerodynamic shape is partially circular or triangular.

10. A light bar cover for covering a light bar, the light bar cover comprising:
a cover portion configured for covering a front portion of the light bar;

a plurality of hinges installed between the cover portion and the light bar, so as to open and close the cover portion about the plurality of hinges;

two or more electromagnets, each of which being installed on an upper portion of the light bar, so as to hold securely the cover portion in an open position, further comprising one or more cover handles, each of which being disposed on an exterior surface of the cover portion.

11. The light bar cover of claim 10, further comprising:
a motor installed on a top edge of the light bar;
a motor gear connected to an axle of the motor; and
a cover gear disposed on a top edge of the cover portion and engaging the motor gear,
wherein the motor, the motor gear, and the cover gear are configured to open or close the cover portion.

12. A light bar cover for covering a light bar, the light bar cover comprising:
a cover holder body including a plurality of fasteners for attaching the frame portion to the light bar and a plurality of cover holders;

a cover portion configured for covering a front portion of the cover holder body and a front portion of the light bar;

a plurality of hinges installed between the cover portion and the cover holder body, so as to open and close the cover portion about the plurality of hinges;

two or more electromagnets, each of which being installed on an upper portion of the cover holder body, so as to hold securely the cover portion in an open position.

13. The light bar cover of claim 12, further comprising:
a motor installed on a top edge of the cover holder body;
a motor gear connected to an axle of the motor; and
a cover gear disposed on a top edge of the cover portion and engaging the motor gear,
wherein the motor, the motor gear, and the cover gear are configured to open or close the cover portion.

* * * * *